United States Patent
Hugon et al.

(10) Patent No.: US 12,257,564 B2
(45) Date of Patent: Mar. 25, 2025

(54) MASS FOR CAPTURING MERCAPTANS WHICH IS PREPARED USING MOLTEN SALTS

(71) Applicant: IFP Energies Nouvelles, Rueil-Malmaison (FR)

(72) Inventors: Antoine Hugon, Rueil-Malmaison (FR); Philibert Leflaive, Rueil-Malmaison (FR); Antoine Fecant, Rueil-Malmaison (FR)

(73) Assignee: IFP Energies Nouvelles, Rueil-Malmaison (FR)

( * ) Notice: Subject to any disclaimer, the term of this patent is extended or adjusted under 35 U.S.C. 154(b) by 222 days.

(21) Appl. No.: 17/784,768

(22) PCT Filed: Dec. 4, 2020

(86) PCT No.: PCT/EP2020/084660
§ 371 (c)(1),
(2) Date: Jun. 13, 2022

(87) PCT Pub. No.: WO2021/122059
PCT Pub. Date: Jun. 24, 2021

(65) Prior Publication Data
US 2023/0016535 A1 Jan. 19, 2023

(30) Foreign Application Priority Data
Dec. 17, 2019 (FR) ........................................ 1914605

(51) Int. Cl.
| | | |
|---|---|---|
| *B01J 20/02* | (2006.01) | |
| *B01J 20/08* | (2006.01) | |
| *B01J 20/28* | (2006.01) | |
| *B01J 20/30* | (2006.01) | |
| *B01J 20/32* | (2006.01) | |
| *C10G 25/00* | (2006.01) | |

(52) U.S. Cl.
CPC ........... *B01J 20/0225* (2013.01); *B01J 20/08* (2013.01); *B01J 20/28059* (2013.01); *B01J 20/28071* (2013.01); *B01J 20/3078* (2013.01); *B01J 20/3204* (2013.01); *B01J 20/3225* (2013.01); *B01J 20/3236* (2013.01); *C10G 25/003* (2013.01); *C10G 2300/202* (2013.01)

(58) Field of Classification Search
CPC .. B01J 20/0225; B01J 20/08; B01J 20/28059; B01J 20/28071; B01J 20/3078; B01J 20/3204; B01J 20/3225; B01J 20/3236; B01J 20/0237; B01J 20/0244; B01J 20/28004; B01J 20/28064; B01J 20/28073; B01J 20/28076; B01J 20/3214; C10G 25/003; C10G 2300/202
See application file for complete search history.

(56) References Cited

U.S. PATENT DOCUMENTS

| | | | |
|---|---|---|---|
| 5,866,749 A | 2/1999 | Ou | |
| 6,033,556 A * | 3/2000 | Didillon | ............... B01J 37/0018 585/852 |
| 6,579,444 B2 | 6/2003 | Feimer et al. | |
| 6,896,795 B2 | 5/2005 | Didillon et al. | |
| 6,972,086 B2 | 12/2005 | Didillon et al. | |
| 8,066,869 B2 | 11/2011 | Nicolaos et al. | |
| 11,332,676 B2 | 5/2022 | Crozet et al. | |
| 2003/0188992 A1 | 10/2003 | Halbert et al. | |
| 2003/0226786 A1* | 12/2003 | Feimer | ................. C10G 25/003 208/243 |
| 2017/0001863 A1* | 1/2017 | Park | ...................... B01J 35/397 |
| 2020/0070137 A1* | 3/2020 | Tellier | .................... B01J 35/635 |

FOREIGN PATENT DOCUMENTS

| | | | | |
|---|---|---|---|---|
| CN | 109679683 A | * | 4/2019 | ......... B01J 20/3458 |
| FR | 3080117 A1 | * | 10/2019 | ......... B01J 20/0225 |
| FR | 3080117 B1 | | 4/2020 | |

OTHER PUBLICATIONS

International Search Report PCT/EP2020/084660 dated Dec. 23, 2020 (pp. 1-3).
Xue Liu et al: "Drying of Ni/Alumina Catalysts: Control of the Metal Distribution Using Surfactants and the Melt Infiltration Method", Industrial & Engineering Chemistry Research, vol. 53, No. 14, Apr. 9, 2014 (Apr. 9, 2014), pp. 5792-5800, XP055716163, ISSN: 0888-5885, DOI: 10.1021/ie500099c.
Petra E. De Jongh et al: "Melt Infiltration: an Emerging Technique for the Preparation of Novel Functional Nanostructured Materials", Advanced Materials, vol. 25, No. 46, Dec. 1, 2013 (Dec. 1, 2013), pp. 6672-6690, XP055713576, ISSN: 0935-9648, DOI: 10.1002/adma.201301912.

* cited by examiner

*Primary Examiner* — Randy Boyer
*Assistant Examiner* — Juan C Valencia
(74) *Attorney, Agent, or Firm* — Millen, White, Zelano, & Branigan; Csaba Henter

(57) ABSTRACT

The invention describes a mass for scavenging mercaptans which is particularly suitable for the treatment of olefinic gasoline cuts containing sulfur such as gasolines resulting from catalytic cracking. The scavenging mass comprises an active phase based on group VIII, IB or IIB metal particles which is prepared by a step of bringing a porous support into contact with a metal salt of said group VIII, IB or IIB metal and a step heating the resulting mixture to a temperature above the melting point of said metal salt. The invention also relates to a process for using said scavenging mass for the adsorption of mercaptans.

15 Claims, No Drawings

MASS FOR CAPTURING MERCAPTANS WHICH IS PREPARED USING MOLTEN SALTS

FIELD OF THE INVENTION

The present invention relates to the field of hydrotreating gasoline cuts, notably gasoline cuts resulting from fluidized-bed catalytic cracking units. More particularly, the present invention relates to a mass for scavenging mercaptan compounds contained in hydrocarbon fractions using adsorption-type processes or by combining hydrodesulfurization or adsorption steps.

PRIOR ART

Automotive fuel specifications call for a significant reduction in the sulfur content in these fuels, and notably in gasolines. This reduction is notably directed toward limiting the content of sulfur and nitrogen oxides in motor vehicle exhaust gases. The specifications currently in force in Europe since 2009 for gasoline fuels set a maximum content of 10 ppm by weight (parts per million) of sulfur. Such specifications are also in force in other countries, for instance the United States and China, where the same maximum sulfur content has been required since January 2017. To achieve these specifications, it is necessary to treat gasolines via desulfurization processes.

The main sources of sulfur in gasoline bases are "cracking" gasolines, and mainly the gasoline fraction obtained from a process of catalytic cracking of a residue from the atmospheric or vacuum distillation of a crude oil. The gasoline fraction from catalytic cracking, which represents on average 40% of gasoline bases, in fact accounts for more than 90% of the sulfur in gasolines. Consequently, the production of low-sulfur gasolines requires a step of desulfurization of the catalytic cracking gasolines. Among the other sources of gasolines that may contain sulfur, mention may also be made of coker gasolines, visbreaker gasolines or, to a lesser extent, gasolines obtained from atmospheric distillation or steam cracking gasolines.

The removal of sulfur from gasoline cuts consists in specifically treating these sulfur-rich gasolines via desulfurization processes in the presence of hydrogen. These are then referred to as hydrodesulfurization processes (HDS). However, these gasoline cuts, and more particularly the gasolines obtained from FCC, contain a large proportion of unsaturated compounds in the form of monoolefins (about 20% to 50% by weight) which contribute toward a good octane number, diolefins (0.5% to 5% by weight) and aromatics. These unsaturated compounds are unstable and react during the hydrodesulfurization treatment. Diolefins form gums by polymerization during the hydrodesulfurization treatments. This gum formation leads to gradual deactivation of the hydrodesulfurization catalysts or gradual clogging of the reactor. Consequently, the diolefins must be removed by hydrogenation before any treatment of these gasolines. Conventional treatment processes desulfurize gasolines non-selectively by hydrogenating a large portion of the monoolefins, giving rise to a high loss of octane number and high hydrogen consumption. The most recent hydrodesulfurization processes make it possible to desulfurize cracked gasolines rich in monoolefins, while at the same time limiting the hydrogenation of the monoolefins and consequently the loss of octane. Such processes are described, for example, in EP-A-1077247 and EP-A-1174485.

However, when very thorough desulfurization of cracked gasolines needs to be performed, some of the olefins present in the cracked gasolines are hydrogenated, on the one hand, and recombine with $H_2S$ to form mercaptans, on the other hand. This family of compounds, of chemical formula R—SH where R is an alkyl group, are generally called recombination mercaptans, and generally represent between 20% by weight and 80% by weight of the residual sulfur in desulfurized gasolines. Reduction of the recombination mercaptan content may be achieved by catalytic hydrodesulfurization, but this leads to the hydrogenation of a large portion of the monoolefins present in the gasoline, which then leads to a large reduction in the octane number of the gasoline and also to an overconsumption of hydrogen. It is moreover known that the loss of octane due to the hydrogenation of the monoolefins during the hydrodesulfurization step is proportionately greater the lower the targeted sulfur content, i.e. when it is sought to thoroughly remove the sulfur compounds present in the feedstock.

For these reasons, it is thus preferable to treat this partially hydrodesulfurized gasoline via a judiciously chosen adsorption technique which will make it possible simultaneously to remove the sulfur compounds initially present in the cracking gasolines and not converted and the recombination mercaptans, without hydrogenating the monoolefins present, so as to preserve the octane number.

Various solutions are proposed in the literature for extracting these mercaptans from hydrocarbon fractions using adsorption type processes or by combining hydrodesulfurization or adsorption steps. However, there is still a need for more efficient scavenging masses for the extraction of mercaptans for the purpose of limiting the hydrogenation reactions responsible in this context of reducing the octane number of the gasolines concerned.

For example, patent application US 2003/0188992 describes how to desulfurize olefinic gasolines by treating the gasoline in a first hydrodesulfurization step and then removing mercaptan-type sulfur compounds in a finishing step. This finishing step mainly consists of solvent extraction of the mercaptans by scrubbing.

U.S. Pat. No. 5,866,749 proposes a solution for removing the elemental sulfur and mercaptans contained in an olefinic cut by passing the mixture to be treated over a reduced metal chosen from groups IB, IIB and IIIA of the Periodic Table and performed at a temperature below 37° C.

U.S. Pat. No. 6,579,444 discloses a process for removing sulfur from gasolines or the residual sulfur from partially desulfurized gasolines based on the use of a solid containing cobalt and a group VIB metal.

Patent application US2003/0226786 discloses a process for desulfurizing gasoline by adsorption and also methods for regenerating the adsorbent. The adsorbent considered is any hydrotreating catalyst and more particularly solids containing a group VIII metal alone or mixed with a group VIB metal and containing between 2% and 20% by weight of group VIII metal.

Patent FR2908781 discloses a process for scavenging sulfur compounds from a partially desulfurized hydrocarbon feedstock in the presence of an adsorbent comprising at least one group VIII, IB, IIB or IVA metal, the adsorbent being used in reduced form in the absence of hydrogen and at a temperature above 40° C.

The Applicant has discovered, surprisingly, that it is possible to improve the mercaptan-scavenging performance by using a novel scavenging mass, making it possible to significantly increase the mercaptan retention capacity. Furthermore, the process for preparing said scavenging mass makes it possible, without adding solvent and therefore in a very limited number of steps and above all in fewer steps than the conventional preparation process (i.e. by impregnation), to obtain a scavenging mass whose performance in terms of mercaptan retention capacity is higher than that obtained by scavenging masses according to the prior art.

SUBJECTS OF THE INVENTION

The present invention relates to a scavenging mass comprising an active phase based on at least one group VIII, IB or IIB metal, at least partially in reduced form, and a porous support chosen from the group constituted by aluminas, silica, silica-aluminas, or even titanium or magnesium oxides used alone or as a mixture with alumina or silica-alumina, said scavenging mass being able to be obtained by at least the following steps:
 a) said porous oxide support is brought into contact with at least one metal salt comprising at least one group VIII, IB or IIB metal for which the melting point of said metal salt is between 20 and 150° C. to form a solid mixture, the mass ratio between said metal salt and said porous oxide support being between 0.1 and 2.5;
 b) the solid mixture obtained on conclusion of step a) is heated with stirring to a temperature between the melting point of said metal salt and 200° C. to obtain a scavenging mass precursor;
 c) optionally, the solid obtained on conclusion of step b) is dried at a temperature below 200° C. to obtain a dried scavenging mass precursor;
 d) optionally, the solid obtained on conclusion of step b) or c) is calcined at a temperature greater than 200° C. and less than or equal to 1100° C. under an inert atmosphere or under an atmosphere containing oxygen, to obtain a calcined scavenging mass precursor;
 e) the solid obtained on conclusion of step b), possibly c) or d), is reduced to obtain said scavenging mass.

Preferably, said group VIII, IB or IIB metal is chosen from nickel, copper or zinc.

Preferably, the content of group VIII, IB or IIB metal, expressed as group VIII, IB or IIB metal element, is between 5% and 65% by weight relative to the total mass of the scavenging mass.

Preferably, the content of group VIII, IB or IIB metal, expressed as group VIII, IB or IIB metal element, is between 12% and 34% by weight relative to the total mass of the scavenging mass.

Preferably, the total pore volume of said scavenging mass is greater than or equal to 0.3 mL/g and the B.E.T. specific surface area of said scavenging mass is at least 40 m$^2$/g.

Another subject according to the invention relates to a process for preparing a scavenging mass comprising an active phase based on at least one group VIII, IB or IIB metal, at least partially in reduced form, and a porous support chosen from the group constituted by aluminas, silica, silica-aluminas, or even titanium or magnesium oxides used alone or as a mixture with alumina or silica-alumina, said scavenging mass being able to be obtained by at least the following steps:
 a) said porous oxide support is brought into contact with at least one metal salt comprising at least one group VIII, IB or IIB metal for which the melting point of said metal salt is between 20 and 150° C. to form a solid mixture, the mass ratio between said metal salt and said porous oxide support being between 0.1 and 2.5;
 b) the solid mixture obtained on conclusion of step a) is heated with stirring to a temperature between the melting point of said metal salt and 200° C. to obtain a scavenging mass precursor;
 c) optionally, the solid obtained on conclusion of step b) is dried at a temperature below 200° C. to obtain a dried scavenging mass precursor;
 d) optionally, the solid obtained on conclusion of step b) or c) is calcined at a temperature greater than 200° C. and less than or equal to 1100° C. under an inert atmosphere or under an atmosphere containing oxygen, to obtain a calcined scavenging mass precursor;
 e) the solid obtained on conclusion of step b), possibly c) or d), is reduced to obtain said scavenging mass.

Preferably, said metal salt is a hydrated nitrate salt.

Preferably, said metal salt is chosen from copper nitrate trihydrate, copper nitrate hemipentahydrate, copper nitrate hexahydrate, zinc nitrate trihydrate, zinc nitrate hexahydrate and nickel nitrate hexahydrate.

Preferably, the mass ratio of said metal salt to the porous support is between 0.3 and 2.

In one embodiment according to the invention, a step a') of bringing the porous support into contact with an organic compound comprising oxygen and/or nitrogen is performed.

In one embodiment according to the invention, steps a) and a') are performed simultaneously, said organic compound being in solid form to form a solid mixture.

In one embodiment according to the invention, step a') is performed after the sequence of steps a) and b).

Preferably, the mole ratio of said organic compound relative to the group VIII, IB or IIB element is between 0.01 and 5.0 mol/mol.

Another object according to the invention relates to a process for scavenging mercaptans contained in a partially desulfurized hydrocarbon fraction containing sulfur obtained from a catalytic hydrodesulfurization step using the scavenging mass according to the invention or prepared according to the process according to the invention and in which said scavenging mass is brought into contact with the feedstock to be treated at a temperature of between 40 and 250° C., and a pressure of between 0.2 and 5 MPa.

Preferably, the feedstock to be treated is a partially desulfurized catalytic cracking gasoline with a boiling point below 350° C. and containing between 5% and 60% by weight of olefins and less than 100 ppm by weight of sulfur.

DETAILED DESCRIPTION OF THE INVENTION

In the text hereinbelow, the groups of chemical elements are given according to the CAS classification (CRC Handbook of Chemistry and Physics, published by CRC Press, editor-in-chief D. R. Lide, 81$^{st}$ edition, 2000-2001). For example, group VIII according to the CAS classification corresponds to the metals of columns 8, 9 and 10 according to the new IUPAC classification.

The term "specific surface area" means the BET specific surface area ($S_{BET}$ in m$^2$/g) determined by nitrogen adsorption in accordance with the standard ASTM D 3663-78 established from the Brunauer-Emmett-Teller method described in the journal "*The Journal of the American Chemical Society*", 1938, 60, 309.

The term "total pore volume of the scavenging mass or of the support used for the preparation of the scavenging mass according to the invention" means the volume measured by mercury intrusion porosimetry according to the standard ASTM D4284-83 at a maximum pressure of 4000 bar (400 MPa), using a surface tension of 484 dynes/cm and a contact angle of 140°. The wetting angle was taken equal to 140° following the recommendations of the publication "Techniques de l'ingénieur, traité analyse et caractérisation" [Techniques of the Engineer, Analysis and Characterization Treatise], pages 1050-1055, written by Jean Charpin and Bernard Rasneur. In order to obtain better accuracy, the value of the total pore volume corresponds to the value of the total pore volume measured by mercury intrusion porosimetry measured on the sample minus the value of the total pore volume measured by mercury intrusion porosimetry measured on the same sample for a pressure corresponding to 30 psi (approximately 0.2 MPa).

In the present patent application, the term "to comprise" is synonymous with (means the same thing as) "to include" and "to contain", and is inclusive or open and does not exclude other elements which are not stated. It is understood that the term "comprise" includes the exclusive and closed term "consist".

The term "macropores" means pores whose aperture is greater than 50 nm.

The term "mesopores" means pores whose aperture is between 2 nm and 50 nm, limits inclusive.

The term "micropores" means pores whose aperture is less than 2 nm.

The content of group VIII, IB or IIB metal is measured by X-ray fluorescence.

Characteristics of the Scavenging Mass

The scavenging mass according to the invention comprises, is preferably constituted of, an active phase based on at least one group VIII, IB or IIB metal, at least partially in reduced form, and a porous support chosen from the group constituted by aluminas, silica, silica-aluminas, or alternatively titanium or magnesium oxides used alone or as a mixture with alumina or silica-alumina.

The content of group VIII, IB or IIB element is preferably between 5% and 65% by weight relative to the total weight of the scavenging mass, preferably between 8% and 35% by weight. When the scavenging mass comprises several metals chosen from group VIII, IB or IIB elements, the sum of the contents of group VIII, IB or IIB elements is between 5% and 65% by weight, preferably between 8% and 35% in weight. The group VIII, IB or IIB element content is measured by X-ray fluorescence.

Preferably, the group VIII, IB or IIB elements are nickel, copper or zinc.

Very preferably, the active phase only comprises nickel.

The scavenging mass according to the invention preferably has a total pore volume of greater than or equal to 0.3 mL/g, preferably greater than or equal to 0.4 mL/g, and particularly preferably between 0.5 and 1.1 mL/g.

The scavenging mass according to the present invention has a BET specific surface area of at least 40 m$^2$/g, preferably at least 50 m$^2$/g, and even more preferably between 55 and 250 m$^2$/g, preferably between 60 and 225 m$^2$/g.

Said scavenging mass according to the invention is in the form of grains having a mean diameter of between 0.5 and 10 mm. The grains may have any shape known to those skilled in the art, for example the shape of beads (preferably having a diameter of between 1 and 6 mm), extrudates, tablets or hollow cylinders. Preferably, the scavenging mass (and the support used for the preparation of the scavenging mass) are either in the form of extrudates with a mean diameter of between 0.5 and 10 mm, preferably between 0.8 and 3.2 mm, and with a mean length of between 0.5 and 20 mm, or in the form of beads with a mean diameter of between 0.5 and 10 mm, preferably between 1.4 and 4 mm.

The term "mean diameter" of the extrudates means the mean diameter of the circle circumscribed in the cross section of these extrudates. The scavenging mass may advantageously be in the form of cylindrical, multilobal, trilobal or quadrilobal extrudates. Preferably, its form will be trilobal or quadrilobal. The shape of the lobes will be able to be adjusted according to all the known methods of the prior art.

The support of the scavenging mass according to the invention is a mineral support selected from the group constituted by aluminas, silica, silica-aluminas, titanium oxides, alone or as a mixture with alumina or silica-alumina, and magnesium oxides, alone or as a mixture with alumina or silica-alumina. Preferably, the support is selected from the group constituted by aluminas, silica and silica-aluminas. Very preferably, the support is constituted essentially by at least one alumina, i.e. it comprises at least 51% by weight, preferably at least 60% by weight, very preferably at least 80% by weight, or even at least 90% by weight, of alumina, relative to the total weight of said support. Preferably, said support has an alumina content of greater than or equal to 90% by weight, relative to the total weight of said support, optionally supplemented with silica and/or phosphorus in a total content of not more than 10% by weight as $SiO_2$ and/or $P_2O_5$ equivalent, preferably of less than 5% by weight and very preferably of less than 2% by weight, relative to the total weight of the support. The silica and/or the phosphorus may be introduced via any technique known to a person skilled in the art, during the synthesis of the alumina gel or by impregnation of the support used for the preparation of the scavenging mass according to the invention.

Even more preferably, the support is constituted of alumina. Preferably, the alumina present in said support is a transition alumina, such as a γ-, δ-, θ-, χ-, ρ- or η-alumina, alone or as a mixture. More preferably, the alumina is a γ, δ or θ transition alumina, alone or as a mixture.

The following characteristics of the support correspond to the characteristics of the support used for the preparation of the scavenging mass according to the invention before addition of the active phase.

The support used for the preparation of the scavenging mass according to the invention preferably has a total pore volume of greater than or equal to 0.45 ml/g, preferably greater than or equal to 0.60 ml/g and particularly preferably between 0.60 and 1.3 mL/g.

The support used for the preparation of the scavenging mass according to the invention has a BET specific surface area of at least 40 m$^2$/g, preferably at least 50 m$^2$/g, and even more preferably between 60 and 300 m$^2$/g, preferably between 80 and 250 m$^2$/g.

Process for Preparing the Scavenging Mass

The present invention also relates to a process for preparing said scavenging mass according to the invention via a preparation process comprising at least the following steps:

a) said porous oxide support is brought into contact with at least one metal salt comprising at least one group VIII, IB or IIB metal for which the melting point of said metal salt is between 20 and 150° C. to form a solid mixture, the mass ratio between said metal salt and said porous oxide support being between 0.1 and 2.5;

b) the solid mixture obtained on conclusion of step a) is heated with stirring to a temperature between the melting point of said metal salt and 200° C. to obtain a scavenging mass precursor;

c) optionally, the solid obtained on conclusion of step b) is dried at a temperature below 200° C. to obtain a dried scavenging mass precursor;

d) optionally, the solid obtained on conclusion of step b) or c) is calcined at a temperature greater than 200° C. and less than or equal to 1100° C. under an inert atmosphere or under an atmosphere containing oxygen, to obtain a calcined scavenging mass precursor;

e) the solid obtained on conclusion of step b), possibly c) or d), is reduced to obtain said scavenging mass.

According to one variant, the process for preparing the scavenging mass according to the invention may also involve, during step a), bringing said porous oxide support into contact with at least one metal salt and with an organic compound.

According to one variant, the process for preparing the scavenging mass according to the invention may also comprise a step b') of bringing the mixture obtained in step b) into contact with an organic compound, optionally followed by a step b") of drying said impregnated support at a temperature below 250° C.

The steps of the process for preparing the catalyst or the scavenging mass according to the invention are described in detail hereinbelow.

Step a)

According to step a), a porous support of oxide type is brought into contact with a metal salt comprising at least one group VIII, IB or IIB element to form a solid mixture. In this step, the metal salt is in solid form, i.e. said porous support and said metal salt are brought into contact at a temperature below the melting point of said metal salt, said melting point of said metal salt being between 20 and 150° C. When the scavenging mass comprises several metals chosen from metals belonging to group VIII, IB or IIB, step a) is performed at a temperature below the melting point of said metal salts, said melting point of said metal salt being between 20 and 150° C. The contact time is generally between 5 minutes and 12 hours. Preferably, the mass ratio between said metal salt and said porous oxide support is between 0.1 and 2.5, preferably between 0.3 and 2.

According to step a), at least one metal salt comprising at least one metal belonging to group VIII, IB or IIB is provided. Preferably, the melting point of said metal salt is between 20 and 150° C. Preferably, the metals are chosen from Ni, Cu and Zn, taken alone or as a mixture. Very preferably, the metal is Ni. Preferably, the metal salt is hydrated. Preferably, the metal salt is a hydrated nitrate salt. According to one variant, when the metal is Ni, said metal salt is preferably nickel nitrate hexahydrate. Preferably, the metal salt is chosen from copper nitrate trihydrate ($Cu(NO_3)_2 \cdot 3H_2O$, $T_{melting}=114.7°$ C.), copper nitrate hemipentahydrate ($Cu(NO_3)_2 \cdot 2.5H_2O$, $T_{melting}=115°$ C.) or copper nitrate hexahydrate ($Cu(NO_3)_2 \cdot 6H_2O$, $T_{melting}=26.4°$ C.), zinc nitrate trihydrate ($Zn(NO_3)_2 \cdot 3H_2O$, $T_{melting}=45.5°$ C.), zinc nitrate hexahydrate ($Zn(NO_3)_2 \cdot 6H_2O$, $T_{melting}=36.4°$ C.), nickel nitrate hexahydrate ($Ni(NO_3)_2 \cdot 6H_2O$, $T_{melting}=56.7°$ C.), taken alone or as a mixture. Very preferably, the metal salt is nickel nitrate hexahydrate ($Ni(NO_3)_2 \cdot 6H_2O$, $T_{melting}=56.7°$ C.).

According to step a), said porous oxide support and the metal salt may be brought into contact by any method known to those skilled in the art. Preferably, said porous support and the metal salt are brought into contact with contacting means chosen from convective mixers, drum mixers or static mixers. Step b) is preferably performed for a period of from 5 minutes to 5 hours depending on the type of mixer used, preferably between 10 minutes and 4 hours, and even more preferentially between 15 minutes and 3 hours.

Step b)

According to step b), the mixture obtained on conclusion of step a) is heated with stirring to a temperature above the melting point of the metal salt. Preferably, the temperature is between the melting point of the metal salt and 200° C., very preferably between the melting point of the metal salt and 150° C., and at atmospheric pressure. The residence time is generally between 5 minutes and 12 hours, preferably between 5 minutes and 4 hours.

When the scavenging mass comprises several metals chosen from metals belonging to group VIII, IB or IIB, step b) is performed at a temperature greater than or equal to the melting point of said metal salts.

According to step b), mechanical homogenization of the mixture may be performed via any method known to those skilled in the art. Preferably, use may be made of convective mixers, drum mixers or static mixers. Even more preferentially, step b) is performed using a drum mixer, the rotational speed of which is between 4 and 70 revolutions/minute, preferably between 10 and 60 revolutions/minute.

On conclusion of step b), a scavenging mass precursor is obtained.

Step c) (Optional Step)

According to the optional step c), the drying of the solid obtained in step b) is performed at a temperature below 200° C., advantageously between 50° C. and 180° C., preferably between 70° C. and 150° C., very preferably between 75° C. and 130° C.

The drying step is preferentially performed for a period of 1 hour to 16 hours, preferably under an inert atmosphere or under an atmosphere containing oxygen.

The optional drying step may be performed via any technique known to those skilled in the art. It is advantageously performed at atmospheric pressure or at reduced pressure. Preferably, this step is performed at atmospheric pressure. It is advantageously performed using hot air or any other hot gas. Preferably, the gas used is either air, or an inert gas such as argon or nitrogen. Very preferably, the drying is performed in the presence of nitrogen and/or air. Unlike step b), the drying step c) is preferably not performed with stirring.

Step d) (Optional Step)

According to step d), the solid obtained in step b) or c) undergoes a calcination treatment at a temperature above 200° C. and less than or equal to 1100° C., preferably between 250° C. and 650° C., and very preferably between 300° C. and 500° C., under an inert atmosphere (nitrogen for example) or under an atmosphere containing oxygen (air, for example). The duration of this heat treatment is generally less than 16 hours, preferably less than 1 hour. After this treatment, the group VIII, IB or IIB element is in oxide form and the solid no longer contains or contains very few counterions and water of crystallization initially present in the metal salt. The calcining step may be performed via any technique known to those skilled in the art. It is advantageously performed in a crossed bed or in a fluidized bed using hot air or any other hot gas.

A calcined scavenging mass is obtained.

Step e)

According to step e), at least one reducing treatment step is performed in the presence of a reducing gas after steps b), optionally c) or d), so as to obtain a scavenging mass comprising at least one group VIII, IB or IIB metal at least partially in metallic form. This treatment makes it possible to form metallic particles in the zero-valent state. The reducing gas is preferably hydrogen. The hydrogen may be used pure or as a mixture (for example a hydrogen/nitrogen, hydrogen/argon or hydrogen/methane mixture). In the case where the hydrogen is used as a mixture, any proportion may be envisaged.

Said reducing treatment is preferentially performed at a temperature of between 120 and 500° C., preferably between 150 and 450° C. The duration of the reducing treatment is generally between 2 and 40 hours, preferably between 3 and 30 hours. The rise in temperature up to the desired reduction temperature is generally slow, for example set between 0.1 and 10° C./min, preferably between 0.3 and 7° C./min.

After the reduction step e), the scavenging mass according to the invention is ready to be used in a process for adsorbing mercaptans from a hydrocarbon feedstock comprising unsaturated compounds.

Variant: Preparation of the Scavenging Mass Using an Organic Compound

The process for preparing the scavenging mass according to the invention may also optionally comprise a step a') of bringing the support into contact with an organic compound comprising oxygen and/or nitrogen, optionally followed by a step a") of drying said impregnated support at a temperature below 250° C.

The mole ratio of said organic compound relative to the group VIII, IB or IIB element is advantageously between 0.01 and 5.0 mol/mol, preferably between 0.05 and 2.0 mol/mol. When the scavenging mass comprises several metals chosen from metals belonging to group VIII, IB or IIB, the mole ratio of said organic compound relative to all of said metals is preferably between 0.01 and 5.0 mol/mol, preferably between 0.05 and 2.0 mol/mol.

Generally, the organic compound comprising oxygen and/or nitrogen is chosen from a compound including one or more chemical functions chosen from carboxylic acid, alcohol, ether, aldehyde, ketone, ester, carbonate, amine, nitrile, imide, oxime, urea and amide functions. Preferably, the organic compound is chosen from a compound comprising at least one carboxylic acid function, or at least one alcohol function, or at least one ester function, or at least one amide function.

In one embodiment according to the invention, said organic compound comprises at least one carboxylic acid function. Preferably, said organic compound is chosen from monocarboxylic acids, dicarboxylic acids, tricarboxylic acids and tetracarboxylic acids. In this case, the organic compound is more preferentially chosen from oxalic acid, malonic acid, glutaric acid, glycolic acid, lactic acid, succinic acid, tartronic acid, citric acid, acid tartaric, pyruvic acid and γ-ketovaleric acid.

In one embodiment according to the invention, said organic compound comprises at least one alcohol function. Preferably, said organic compound is chosen from:
organic compounds comprising a single alcohol function;
organic compounds comprising two alcohol functions;
organic compounds chosen from diethylene glycol, triethylene glycol, tetraethylene glycol or a polyethylene glycol corresponding to the formula $H(OC_2H_4)_nOH$ with n greater than 4 and having an average molar mass of less than 20000 g/mol;
monosaccharides of empirical formula $C_n(H_2O)_p$ with n between 3 and 12;
disaccharides, trisaccharides, or monosaccharide derivatives.

In this case, the organic compound is more preferentially chosen from methanol, ethanol, phenol, ethylene glycol, propane-1,3-diol, butane-1,4-diol, pentane-1,5-diol, hexane-1,6-diol, glycerol, xylitol, mannitol, sorbitol, pyrocatechol, resorcinol, hydroquinol, diethylene glycol, triethylene glycol, polyethylene glycols with an average molar mass of less than 600 g/mol, glucose, mannose, fructose, sucrose, maltose or lactose, in any one of the isomeric forms thereof.

In one embodiment according to the invention, said organic compound comprises at least one ester function.
Preferably, said organic compound is chosen from:
unsaturated linear or cyclic carboxylic acid esters;
organic compounds comprising at least two carboxylic acid ester functions;
organic compounds comprising at least one carboxylic acid ester function and at least one second function chosen from alcohols, ethers, ketones or aldehydes;
cyclic or linear carbonic acid esters;
linear carbonic acid diesters.

In this case, the organic compound is more preferentially chosen from γ-valerolactone, methyl laurate, di($C_1$-$C_4$ alkyl) succinate and more particularly dimethyl succinate, dimethyl malate, an aceto acid and propylene carbonate.

In one embodiment according to the invention, said organic compound comprises at least one amide function.
Preferably, said organic compound is chosen from:
acyclic amides comprising one or two amide functions;
cyclic amides or lactams;
organic compounds comprising at least one amide function and a carboxylic acid function or an alcohol function;
organic compounds comprising at least one amide function and an additional nitrogen heteroatom.

In this case, the organic compound is more preferentially chosen from formamide, N-methylformamide, N,N-dimethylformamide, N-ethylformamide, N,N-diethylformamide, acetamide, N-methylacetamide, N,N-dimethylmethanamide, N,N-diethylacetamide, N,N-dimethylpropionamide, propanamide, 2-pyrrolidone, N-methyl-2-pyrrolidone, γ-lactam, caprolactam, acetylleucine, N-acetylaspartic acid, aminohippuric acid, N-acetylglutamic acid, 4-acetamidobenzoic acid, lactamide, glycolamide, urea, N-methylurea, N,N'-dimethylurea, 1,1-dimethylurea and tetramethylurea in any one of the isomeric forms thereof.

Mode of introduction of the organic compound

The variant of the process for preparing the scavenging mass involving step a'), possibly a"), includes several embodiments when it is desired to add the organic compound. They are notably distinguished by the order of introduction of the organic compound and of the precursor of the group VIII, IB or IIB metal, the bringing into contact of the organic compound with the support being able to be performed either after the bringing into contact of the precursor of the group VIII, IB or IIB metal with the support, or during the bringing into contact of the precursor of the group VIII, IB or IIB metal with the support.

In one embodiment according to the invention, step a') is performed at the same time as step a), i.e. the contacting of the support is performed in the presence of at least one metal salt comprising at least one group VIII, IB or IIB metal and at least one organic compound to form a solid mixture. In this embodiment variant, the organic additive must be in solid form to form a solid mixture.

In another embodiment according to the invention, step a') is performed after the sequence of steps a) and b). In this embodiment, step a') may be performed by impregnation, according to methods that are well known to those skilled in the art. Preferably, said step a') is performed by dry impregnation, which consists in bringing the support for the scavenging mass into contact with a volume of said solution of between 0.25 and 1.5 times the pore volume of the support. Said solution containing at least one organic compound may be aqueous or organic (for example methanol or ethanol or phenol or acetone or toluene or dimethyl sulfoxide (DMSO)) or else formed of a mixture of water and of at least one organic solvent. Said organic compound is, beforehand, at least partially dissolved in said solution at the desired concentration. Preferably, said solution is aqueous or contains ethanol. Even more preferably, said solution is aqueous. The pH of said solution will be able to be modified by optional addition of an acid or a base. In another possible embodiment, the solvent may be absent from the impregnation solution. In the embodiment in which step a') is performed by dry impregnation or excess impregnation, preferably dry impregnation, the impregnation of the support with at least one solution containing at least said organic compound may advantageously be performed via at least two impregnation cycles, using identical or different organic compounds in each cycle. In this case, each impregnation is advantageously followed by drying and optionally by a heat treatment. In this embodiment variant, after the step of bringing the organic compound into contact with the support, the impregnated support may advantageously be allowed to mature, optionally before an intermediate drying step. When a maturing step is performed, said step is advantageously performed at atmospheric pressure or at reduced pressure, under an inert atmosphere or under an oxygen-containing atmosphere or under a water-containing atmosphere, and at a temperature of between 10° C. and 50° C. and preferably at ambient temperature. Generally, a maturing time of less than forty-eight hours and preferably of between five minutes and five hours is sufficient.

In the embodiment in which step a') is performed after the sequence of steps a) and b), step a') is followed by a step a") of drying at a temperature below 250° C., preferably between 15 and 240° C., more preferentially between 30 and 220° C., even more preferentially between 50 and 200° C., and even more preferentially between 70 and 180° C.

Each step a), b) and a') (optionally a") may be performed several times, optionally in the presence of a precursor of group VIII, IB or IIB and/or of an organic compound which may be identical or different in each step a) and b) and/or a'), respectively, all the possible combinations of implementations of steps a) and b) and/or a') being included within the scope of the invention.

Process for Scavenging Mercaptans

The invention also relates to a process for scavenging mercaptans contained in a partially desulfurized hydrocarbon fraction containing sulfur obtained from a catalytic hydrodesulfurization step using said scavenging mass and in which said scavenging mass is brought into contact with the feedstock to be treated.

Said scavenging mass is generally used at a temperature of between 40° C. and 250° C., preferably between 100° C. and 250° C., preferably between 130° C. and 240° C.

Said scavenging mass is generally used at an hourly space velocity (which is defined as the volumetric flow rate of inlet feedstock per volume of adsorbent used) of between 0.1 $h^{-1}$ and 20 $h^{-1}$, preferably between 0.5 $h^{-1}$ and 15 $h^{-1}$, preferably between 0.5 $h^{-1}$ and 10 $h^{-1}$.

The scavenging mass is generally used in the absence of hydrogen. The feedstock must preferably remain liquid, which requires sufficient pressure greater than the vaporization pressure of the feedstock. Said scavenging mass is generally used at a pressure of between 0.2 MPa and 5 MPa, preferably between 0.2 MPa and 2 MPa.

The partially desulfurized hydrocarbon fraction containing sulfur is preferably a gasoline containing olefinic compounds, preferably a gasoline cut obtained from a catalytic cracking process. The treated hydrocarbon fraction generally has a boiling point below 350° C., preferably below 300° C. and very preferably below 250° C. Preferably, the hydrocarbon fraction contains less than 100 ppm by weight of sulfur and preferably less than 50 ppm by weight of sulfur, notably in the form of recombination mercaptans.

The feedstock to be treated undergoes a partial desulfurization treatment before the mercaptan scavenging process: the step consists in bringing the hydrocarbon fraction containing sulfur into contact with hydrogen, in one or more hydrodesulfurization reactors in series, containing one or more catalysts suitable for performing the hydrodesulfurization. Preferably, the operating pressure of this step is generally between 0.5 MPa and 5 MPa, and very preferably between 1 MPa and 3 MPa, and the temperature is generally between 200° C. and 400° C., and very preferably between 220° C. and 380° C. Preferably, the amount of catalyst used in each reactor is generally such that the ratio between the flow rate of gasoline to be treated, expressed in $m^3$ per hour under standard conditions, per $m^3$ of catalyst is between 0.5 $h^{-1}$ and 20 $h^{-1}$, and very preferably between 1 $h^{-1}$ and 10 $h^{-1}$. Preferably, the hydrogen flow rate is generally such that the ratio between the hydrogen flow rate expressed in normal $m^3$ per hour ($Nm^3/h$) and the flow to be treated expressed in $m^3$ per hour under standard conditions is between 50 $Nm^3/m^3$ and 1000 $Nm^3/m^3$, very preferably between 70 $Nm^3/m^3$ and 800 $Nm^3/m^3$. Preferably, this step will be performed for the purpose of performing hydrodesulfurization selectively, i.e. with a level of hydrogenation of the monoolefins of less than 80% by weight, preferably less than 70% weight and very preferably less than 60% weight.

The degree of desulfurization achieved during this hydrodesulfurization step is generally greater than 50% and preferably greater than 70%, such that the hydrocarbon fraction used in the mercaptan scavenging process contains less than 100 ppm by weight of sulfur and preferably less than 50 ppm by weight of sulfur.

Any hydrodesulfurization catalyst may be used in the preliminary hydrodesulfurization step. Preferably, use is made of catalysts which have high selectivity with respect to the hydrodesulfurization reactions, in comparison with the olefin hydrogenation reactions. Such catalysts comprise at least one porous and amorphous mineral support, a group VIB metal, a group VIII metal. The group VIB metal is preferentially molybdenum or tungsten and the group VIII metal is preferentially nickel or cobalt. The support is generally selected from the group constituted by aluminas, silica, silica-aluminas, silicon carbide, titanium oxides, alone or as a mixture with alumina or silica-alumina, and magnesium oxides, alone or as a mixture with alumina or silica-alumina. Preferably, the support is selected from the group constituted by aluminas, silica and silica-aluminas. Preferably, the hydrodesulfurization catalyst used in the additional hydrodesulfurization step(s) has the following features:

the content of group VIB elements is between 1% and 20% by weight of oxides of group VIB elements;

the content of group VIII elements is between 0.1% and 20% by weight of oxides of group VIII elements;

the mole ratio (group VIII elements/group VIB elements) is between 0.1 and 0.8.

A very preferred hydrodesulfurization catalyst comprises cobalt and molybdenum and has the abovementioned features. Furthermore, the hydrodesulfurization catalyst may comprise phosphorus. In this case, the phosphorus content is preferably between 0.1% and 10% by weight of $P_2O_5$, relative to the total weight of catalyst, and the mole ratio of phosphorus to group VIB elements is greater than or equal to 0.25, preferably greater than or equal to 0.27.

At the end of the hydrodesulfurization step, the effluent undergoes a step of separation of hydrogen and $H_2S$ via any method known to those skilled in the art (separation vessel, stabilization column, etc.), so as to recover a liquid effluent such that the dissolved $H_2S$ represents not more than 30% by weight, or even 20% by weight, or even 10% by weight of the total sulfur present in the hydrocarbon fraction to be treated downstream by the mercaptan scavenging process.

The invention is illustrated by the examples that follow.

EXAMPLES

Example 1: Scavenging Mass Containing Ni Prepared by Impregnation According to the Prior Art (Non-Compliant)

In this example, the scavenging mass A is prepared by double dry impregnation of the alumina support via an aqueous solution of nickel nitrate hexahydrate. Drying at 120° C. for 12 hours followed by calcination at 450° C. for 6 hours is performed after each impregnation. The solid is then reduced under a stream of hydrogen at 400° C. for 16 hours. The scavenging mass A comprises 23.6% by weight of nickel relative to the total weight of the catalyst.

Example 2: Scavenging Mass Containing Ni According to the Invention (Compliant)

In this example, the scavenging mass B is prepared via the process according to the invention.

An alumina support in the form of beads and a nickel nitrate hexahydrate salt (Aldrich®, >98%) are supplied to a homogenization step. The homogenization step is a drum mixer inclined at 45° and equipped with counter-blades to ensure a cascade movement during the mixing of the solids. The mixer is stirred at 60 rpm for 1 hour at ambient temperature and pressure. The solid mixture obtained is then sent to a heating capacity with stirring in which the temperature is increased at 5° C./min up to 80° C. and left for 1 hour. The solid obtained is then calcined at 450° C. for 6 hours in a traversed bed, then reduced under a flow of hydrogen at 400° C. for 16 hours. The scavenging mass B obtained contains 23.5% by weight of Ni relative to the weight of the catalyst.

Example 3: Evaluation of the Performances of the Scavenging Masses with Regard to the Scavenging of Mercaptans The evaluation of the performances of masses A (non-compliant) and B (according to the invention) based on nickel is performed by monitoring the performance for the dynamic and saturation scavenging of hexanethiol in a hydrocarbon matrix. 10 mL of the solid tested are introduced beforehand into a test column 1 cm in diameter. The solid is reactivated in situ under a flow of 10 L/h of hydrogen at 400° C. for 2 hours. A hydrocarbon matrix called the feedstock is prepared beforehand by mixing heptane and hexanethiol, so as to obtain a matrix containing 2000 ppm by weight of sulfur. The column containing the solid is then placed under a stream of heptane at an hourly space velocity of 20 $h^{-1}$ (200 mL of feedstock per hour per 10 mL of solid), at 200° C. and under a pressure of 0.7 MPa. The experiment begins when the heptane stream is replaced with a feedstock stream at an hourly space velocity of 20 $h^{-1}$, at 200° C. and under a pressure of 0.7 MPa. The effluents leaving the column are analyzed so as to determine the sulfur concentration of the treated matrix.

The dynamic performance of the solid corresponds to the amount of sulfur retained by the solid when the concentration of the effluents corresponds to one tenth of the concentration of the feedstock. The experiment is maintained until the amount of sulfur introduced into the column corresponds to 40% of the weight of the solid tested. The saturation performance of the solid corresponds to the amount of sulfur measured by elemental analysis on the solid after the experiment. The results are collated in Table 1 below.

| Scavenging mass | A (comparative) | B (according to the invention) |
|---|---|---|
| $S_{BET}$ support ($m^2 \cdot g^{-1}$) | 152 | 152 |
| $V_{porous}$ support ($mL \cdot g^{-1}$) | 1.01 | 1.01 |
| Ni content (%) | 23.6 | 23.5 |
| Dynamic performance (g of sulfur retained) | 0.44 | 0.59 |
| Saturation performance (weight % of sulfur) | 6.7 | 7.5 |

The invention claimed is:

1. A process for preparing a scavenging mass comprising an active phase based on at least one group VIII, IB or IIB metal, at least partially in reduced form, and a porous support chosen from aluminas, silica, silica-aluminas, or titanium or magnesium oxides alone or as a mixture with alumina or silica-alumina, said scavenging mass having been obtained by at least the following steps:
   a) bringing into contact said porous oxide support with at least one metal salt comprising at least one group VIII, IB or IIB metal for which the melting point of said metal salt is between 2° and 150° C. to form a solid mixture, the mass ratio between said metal salt and said porous oxide support being between 0.1 and 2.5;
   a') bringing the porous support into contact with an organic compound comprising oxygen and/or nitrogen;
   b) heating the solid mixture obtained on conclusion of step a) with stirring to a temperature between the melting point of said metal salt and 200° C. to obtain a scavenging mass precursor;
   c) optionally drying the solid obtained on conclusion of step b) at a temperature below 200° C. to obtain a dried scavenging mass precursor;
   d) optionally calcining the solid obtained on conclusion of step b) or c) at a temperature greater than 200° C. and less than or equal to 1100° C. under an inert atmosphere or under an atmosphere containing oxygen to obtain a calcined scavenging mass precursor;
   e) reducing the solid obtained on conclusion of step b), c) or d) to obtain said scavenging mass.

2. The process as claimed in claim 1, in which steps a) and a') are performed simultaneously, said organic compound being in solid form to form a solid mixture.

3. The process as claimed in claim 1, in which step a') is performed after the sequence of steps a) and b).

4. The process as claimed in claim 1, in which the mole ratio of said organic compound relative to the group VIII, IB or IIB element is between 0.01 and 5.0 mol/mol.

5. A process for scavenging mercaptans contained in a partially desulfurized hydrocarbon fraction containing sulfur obtained from a catalytic hydrodesulfurization step by the scavenging mass as claimed in claim 1, comprising bringing into contact said scavenging mass with a feedstock at a temperature of 40 to 250° C., and a pressure of 0.2 to 5 MPa.

6. The scavenging process as claimed in claim 5, in which the feedstock is a partially desulfurized catalytic cracking gasoline with a boiling point below 350° C. and containing between 5% and 60% by weight of olefins and less than 100 ppm by weight of sulfur.

7. The process as claimed in claim 1, in which the organic compound comprising oxygen and/or nitrogen is chosen from oxalic acid, malonic acid, glutaric acid, glycolic acid, lactic acid, succinic acid, tartronic acid, citric acid, acid tartaric, pyruvic acid and γ-ketovaleric acid.

8. A process for scavenging mercaptans contained in a partially desulfurized hydrocarbon fraction containing sulfur obtained from a catalytic hydrodesulfurization step by a scavenging mass, comprising bringing into contact said scavenging mass with a feedstock at a temperature of 40 to 250° C., and a pressure of 0.2 to 5 MPa,
wherein said scavenging mass comprises an active phase based on at least one group VIII, IB or IIB metal, at least partially in reduced form, and a porous support chosen from aluminas, silica, silica-aluminas, or titanium or magnesium oxides alone or as a mixture with alumina or silica-alumina, said scavenging mass having been obtained by at least the following steps:
a) bringing into contact said porous oxide support with at least one metal salt comprising at least one group VIII, IB or IIB metal for which the melting point of said metal salt is between 2° and 150° C. to form a solid mixture, the mass ratio between said metal salt and said porous oxide support being between 0.1 and 2.5;
b) heating the solid mixture obtained on conclusion of step a) with stirring to a temperature between the melting point of said metal salt and 200° C. to obtain a scavenging mass precursor;
c) optionally drying the solid obtained on conclusion of step b) at a temperature below 200° C. to obtain a dried scavenging mass precursor;
d) optionally calcining the solid obtained on conclusion of step b) or c) at a temperature greater than 200° C. and less than or equal to 1100° C. under an inert atmosphere or under an atmosphere containing oxygen to obtain a calcined scavenging mass precursor;
e) reducing the solid obtained on conclusion of step b), c) or d) to obtain said scavenging mass.

9. The scavenging process as claimed in claim 8, in which the feedstock is a partially desulfurized catalytic cracking gasoline with a boiling point below 350° C. and containing between 5% and 60% by weight of olefins and less than 100 ppm by weight of sulfur.

10. The scavenging process as claimed in claim 8, wherein, in said scavenging mass, said group VIII, IB or IIB metal is nickel, copper or zinc.

11. The scavenging process as claimed in claim 8, wherein, in said scavenging mass, the content of group VIII, IB or IIB metal, expressed as group VIII, IB or IIB metal element, is between 5% and 65% by weight relative to the total mass of the scavenging mass.

12. The scavenging process as claimed in claim 8, wherein, in said scavenging mass, the content of group VIII, IB or IIB metal, expressed as group VIII, IB or IIB metal element, is between 12% and 34% by weight relative to the total mass of the scavenging mass.

13. The scavenging process as claimed in claim 8, wherein the total pore volume of said scavenging mass is greater than or equal to 0.3 mL/g and the BET specific surface area of said scavenging mass is at least 40 m$^2$/g.

14. A process for scavenging mercaptans contained in a partially desulfurized hydrocarbon fraction containing sulfur obtained from a catalytic hydrodesulfurization step by a scavenging mass, comprising bringing into contact said scavenging mass with a feedstock at a temperature of 100° C. to 250° C., and a pressure of 0.2 to 5 MPa, wherein said scavenging mass comprises an active phase based on at least one group VIII, IB or IIB metal, at least partially in reduced form, and a porous support chosen from aluminas, silica, silica-aluminas, or titanium or magnesium oxides alone or as a mixture with alumina or silica-alumina, said scavenging mass having been obtained by at least the following steps:
a) bringing into contact said porous oxide support with at least one metal salt comprising at least one group VIII, IB or IIB metal for which the melting point of said metal salt is between 2° and 150° C. to form a solid mixture, the mass ratio between said metal salt and said porous oxide support being between 0.1 and 2.5;
b) heating the solid mixture obtained on conclusion of step a) with stirring to a temperature between the melting point of said metal salt and 200° C. to obtain a scavenging mass precursor;
c) optionally drying the solid obtained on conclusion of step b) at a temperature below 200° C. to obtain a dried scavenging mass precursor;
d) optionally calcining the solid obtained on conclusion of step b) or c) at a temperature greater than 200° C. and less than or equal to 1100° C. under an inert atmosphere or under an atmosphere containing oxygen to obtain a calcined scavenging mass precursor;
e) reducing the solid obtained on conclusion of step b), c) or d) to obtain said scavenging mass.

15. The scavenging process as claimed in claim 14, in which the feedstock is a partially desulfurized catalytic cracking gasoline with a boiling point below 350° C. and containing between 5% and 60% by weight of olefins and less than 100 ppm by weight of sulfur.

\* \* \* \* \*